UNITED STATES PATENT OFFICE.

FRITZ BENDER AND BERTRAM MAYER, OF MÜHLHEIM-ON-THE-MAIN, GERMANY, ASSIGNORS TO FARBWERK MÜHLHEIM, VORM. A. LEONHARDT & CO., OF SAME PLACE.

GREEN-BLUE DYE AND PROCESS OF MAKING SAME.

SPECIFICATION forming part of Letters Patent No. 673,632, dated May 7, 1901.

Application filed February 25, 1901. Serial No. 48,687. (No specimens.)

*To all whom it may concern:*

Be it known that we, FRITZ BENDER and BERTRAM MAYER, doctors of philosophy, chemists, residing at Biebesheimerstrasse 34, Mühlheim-on-the-Main, Germany, have invented new and useful Improvements in Green-Blue Dye and Process of Making Same, (for which Letters Patent have been applied for in Germany, application F. 13,691, dated January 14, 1901,) of which the following is a specification.

Our invention relates to a new greenish-blue coloring-matter which may be obtained by condensing tetramethyldiamidobenzhydrol with paratoluenesulfonic acid, sulfonating the thus-obtained leucomonosulfonic acid, and oxidizing the thus-formed leucodisulfonic acid. This process may be carried out in the following manner:

First. A mixture of molecular proportions of tetramethyldiamidobenzhydrol and the sodium salt of paratoluenesulfonic acid is poured into about five parts of concentrated sulfuric acid, and the obtained solution is heated for several hours on the water-bath until the hydrol has disappeared, which may be ascertained by known methods. The leucomonosulfonic acid may be isolated, if desired, by pouring the melt into ice-water and supersaturating with soda-lye. The obtained sodium salt may be crystallized from an aqueous solution. The aqueous solution is precipitated by common salt. By adding acetic acid to the aqueous solution the free leucomonosulfonic acid is precipitated. Instead of the sodium salt of paratoluenesulfonic acid the free acid or the chlorid of this acid may be employed, the latter being saponified by concentrated sulfuric acid.

Second. One part of the sodium salt of the leucomonosulfonic acid is introduced in five parts of fuming sulfuric acid of twenty per cent. $SO_3$, and the solution is heated at about 70° centigrade until a sample becomes completely soluble in dilute alkali and the solution becomes no more precipitated by common salt. In order to isolate the leucodisulfonic acid, the melt may be poured in ice-water and transformed into the lime and sodium salt. From the concentrated solution of the latter the greatest part of the free leucodisulfonic acid separates by acidifying with hydrochloric acid. The leucodisulfonic acid is difficultly soluble in water, but easily soluble in alkaline liquids and may be easily obtained in a well-crystallized state. In order to obtain this leucodisulfonic acid, it is not necessary to start from the isolated leucomonosulfonic acid; but the raw melt containing the latter may be further sulfonated by adding the corresponding quantity of fuming sulfuric acid.

Third. Fifty parts of the leucodisulfonic acid are dissolved in seven hundred parts of water and fifteen parts of caustic-soda lye of 40° Baumé. The solution is mixed in the cold with forty-eight parts of a paste of peroxid of lead of fifty per cent., and then sixty parts of acetic acid of fifty per cent. are added. After precipitating the lead by sulfate of sodium the solution is filtered and evaporated to dryness or precipitated by saturating it with sulfate of sodium. Instead of peroxid of lead other oxidizing agents may be employed; but we have not found any advantage in employing such other oxidizing agents.

The obtained dyestuff forms when dried a dark powder of a copper-like luster. It dissolves in water with a beautiful blue color. The solution when mixed with soda-lye becomes slowly decolorized in the cold, more rapidly in the heat. Acetic acid restores the color. The coloring-matter dissolves in a small quantity of sulfuric acid with a yellow color, which by the addition of water turns from green to blue. Similar coloring-matters are obtained by employing instead of tetramethyldiamidobenzhydrol other alkilated diamidobenzhydrols. Thus, for instance, by employing tetraethyldiamidobenzhydrol a blue coloring-matter of a more greenish tint is obtained.

Now what we claim, and desire to secure by Letters Patent, is the following:

1. The process for producing new greenish-blue coloring-matters, consisting in condensing alkilated diamidobenzhydrols with paratoluenesulfonic acid sulfonating the leucomonosulfonic acid and oxidizing afterward.

2. The process for producing a new greenish-blue coloring-matter consisting in condensing tetramethyldiamidobenzhydrol with paratoluenesulfonic acid sulfonating the leucomonosulfonic acid to a disulfonic acid and oxidizing the latter.

3. The herein-described blue coloring-matters forming in a dry state dark powders of metallic luster dissolving in water with a blue color the solution being gradually decolorized by caustic-soda lye and dyeing wool in bright and even shades.

4. The herein-described specific greenish-blue dyestuff which, in a dry state, is a dark powder of a copper-like luster, soluble in water with a beautiful blue color, the solution when mixed with soda-lye being slowly decolorized in the cold, more rapidly in the heat, acetic acid restoring the color, said dye dissolving in a small quantity of sulfuric acid with a yellow color which on the addition of water turns from green to blue.

In testimony whereof we have signed our names to this specification in the presence of two subscribing witnesses.

FRITZ BENDER.
BERTRAM MAYER.

Witnesses:
HERMANN WEIL,
EVA SATTLER.